US008134756B2

(12) United States Patent
Yoneda et al.

(10) Patent No.: US 8,134,756 B2
(45) Date of Patent: Mar. 13, 2012

(54) SCANNING APPARATUS

(75) Inventors: Yutaka Yoneda, Ishikawa (JP); Kazunari Miyamura, Ishikawa (JP)

(73) Assignee: PFU Limited, Ishikawa (JP)

( * ) Notice: Subject to any disclaimer, the term of this patent is extended or adjusted under 35 U.S.C. 154(b) by 761 days.

(21) Appl. No.: 12/021,993

(22) Filed: Jan. 29, 2008

(65) Prior Publication Data

US 2008/0225343 A1 Sep. 18, 2008

(30) Foreign Application Priority Data

Mar. 14, 2007 (JP) ................................ 2007-064280

(51) Int. Cl.
*H04N 1/04* (2006.01)

(52) U.S. Cl. ........ 358/474; 358/497; 358/498; 358/471; 358/494

(58) Field of Classification Search .................. 358/474, 358/497, 498, 494, 471
See application file for complete search history.

(56) References Cited

U.S. PATENT DOCUMENTS

| | | | | |
|---|---|---|---|---|
| 5,355,357 A | * | 10/1994 | Yamamori et al. | 720/646 |
| 5,443,320 A | * | 8/1995 | Agata et al. | 400/715 |
| 5,479,269 A | * | 12/1995 | Bronnenberg et al. | 358/403 |
| 5,877,746 A | | 3/1999 | Parks et al. | |
| 6,078,407 A | * | 6/2000 | Ma | 358/474 |
| 6,320,650 B1 | * | 11/2001 | Fredlund et al. | 355/75 |
| 6,640,083 B2 | * | 10/2003 | Conard-White et al. | 399/377 |
| 7,050,206 B2 | * | 5/2006 | Payne et al. | 358/488 |
| 2004/0070798 A1 | * | 4/2004 | Andersen et al. | 358/498 |
| 2006/0261539 A1 | | 11/2006 | Terada | |
| 2007/0002392 A1 | | 1/2007 | Ogura | |

FOREIGN PATENT DOCUMENTS

| | | |
|---|---|---|
| CN | 1614985 | 5/2005 |
| JP | 09163057 | 6/1997 |
| JP | 2001154757 | 6/2001 |
| JP | 2002094711 | 3/2002 |
| JP | 2003134284 | 5/2003 |
| JP | 2004282439 | 10/2004 |
| JP | 2006270200 | 10/2006 |
| JP | 2007013607 | 1/2007 |

OTHER PUBLICATIONS

Chinese Office Action #200810081435.8, dated Nov. 6, 2009.
Chinese Office Action for Application No. 200810082954.6 mailed Apr. 7, 2011.
Kodak Document Imaging—SCAN Station 100—http://wwwjp.kodak.com/JP/ja/business/products/networks/scanStation100.shtml and English Translation, (Date: Oct. 16, 2009).
Japanese Office Action for Application No. 2007-064280 mailed Jun. 28, 2011.
Japanese Office Action for JP2007-106490 mailed Oct. 4, 2011.

* cited by examiner

*Primary Examiner* — Houshang Safaipour
(74) *Attorney, Agent, or Firm* — Lowe, Hauptman, Ham & Berner, LLP

(57) ABSTRACT

A keyboard and a display screen are arranged to cover an upper side a main body of an ADF-type scanning apparatus, so that a large space can be secured to arrange the keyboard and the display screen. The display screen includes an ADF-cover opening-closing mechanism that opens and closes the display screen in conjunction with an ADF cover. The keyboard includes a keyboard raising mechanism for raising a front portion of the keyboard in the upward direction.

8 Claims, 5 Drawing Sheets

SCANNING APPARATUS

BACKGROUND OF THE INVENTION

RELATED APPLICATIONS

The present application is based on, and claims priority from, Japan Application Number 2007-064280, filed Mar. 14, 2007, the disclosure of which is hereby incorporated by reference herein in its entirety.

1. Field of the Invention

The present invention relates to a scanning apparatus such as a network scanner, which is connected to a network, sharedly used by a plurality of users, and that includes an input output device such as a display screen and a keyboard, and, more particularly to a technology that enables, for enhancing convenience of the users, to realize inclusion of a large display screen and a full size keyboard and to reduce an installation area of the scanning apparatus.

2. Description of the Related Art

Recently, a network such as a local area network (LAN) is increasingly used in offices. A plurality of users shares a single device such as a printer that is connected to the network.

Even in an increasingly used scanning apparatus such as a network scanner, the users sharedly use a single scanning apparatus that is connected to the network.

The network scanner mentioned earlier includes a function that transmits image data that is read by the scanning apparatus to a specified personal computer (PC) that is connected to the network. When transmitting the image data to the PC, a destination PC needs to be specified, and a password needs to be input for security requirements. Due to this, an input device such as a keyboard and an output device such as a display screen need to be included.

In an automatic document feeder (ADF) type scanner among the network scanners, if a plurality of documents is set in an ADF, the ADF type scanner can continuously feed sheets automatically and continuously read the multiple documents. Thus, the ADF type scanner is extremely convenient for converting a large number of documents into the image data.

In a commonly used ADF-type network scanner, using a significantly large installation area reduces a degree of freedom of an installation space of the scanning apparatus and causes inconvenience to the user. Due to this, for reducing the installation area of the scanning apparatus by as much as possible, a small numerical keypad or a touch panel is used as the keyboard, and a small screen is used as the display screen (see http://www.jp.kodak.com/JP/ja/business/products/network/scan Station100.shtml).

However, increasing the compactness of an input output device for reducing the installation area of the scanning apparatus affects convenience of the user when using the scanning apparatus.

Thus, a conventional technology mentioned earlier includes the following drawbacks.

Along with the recent spread of the network such as the LAN, the scanning apparatus such as the network scanner is increasingly used in which the users sharedly use the single scanning apparatus that is connected to the network.

The network scanner includes the function that transmits the read image data to the specified PC that is connected to the network. For using the function, the destination PC needs to be specified and the password needs to be input for ensuring security. Thus, the network scanner needs to include the input output device such as the keyboard and the display screen.

However, the commonly used network scanner, especially the ADF type scanner uses the compact input output device such as the keyboard and the display screen for securing the degree of freedom of the installation space of the scanning apparatus. Due to this, although the installation area can be reduced, convenience of the user is also affected when the user specifies a destination of the image data or when the user inputs the password for security requirements.

SUMMARY OF THE INVENTION

It is an object of the present invention to at least partially solve the problems in the conventional technology.

According to an aspect of the present invention, there is provided a scanning apparatus for scanning a document including an automatic document feeder that automatically feeds a plurality of documents one by one, and a keyboard and a display screen arranged to cover an upper side of a main body of the scanning apparatus.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
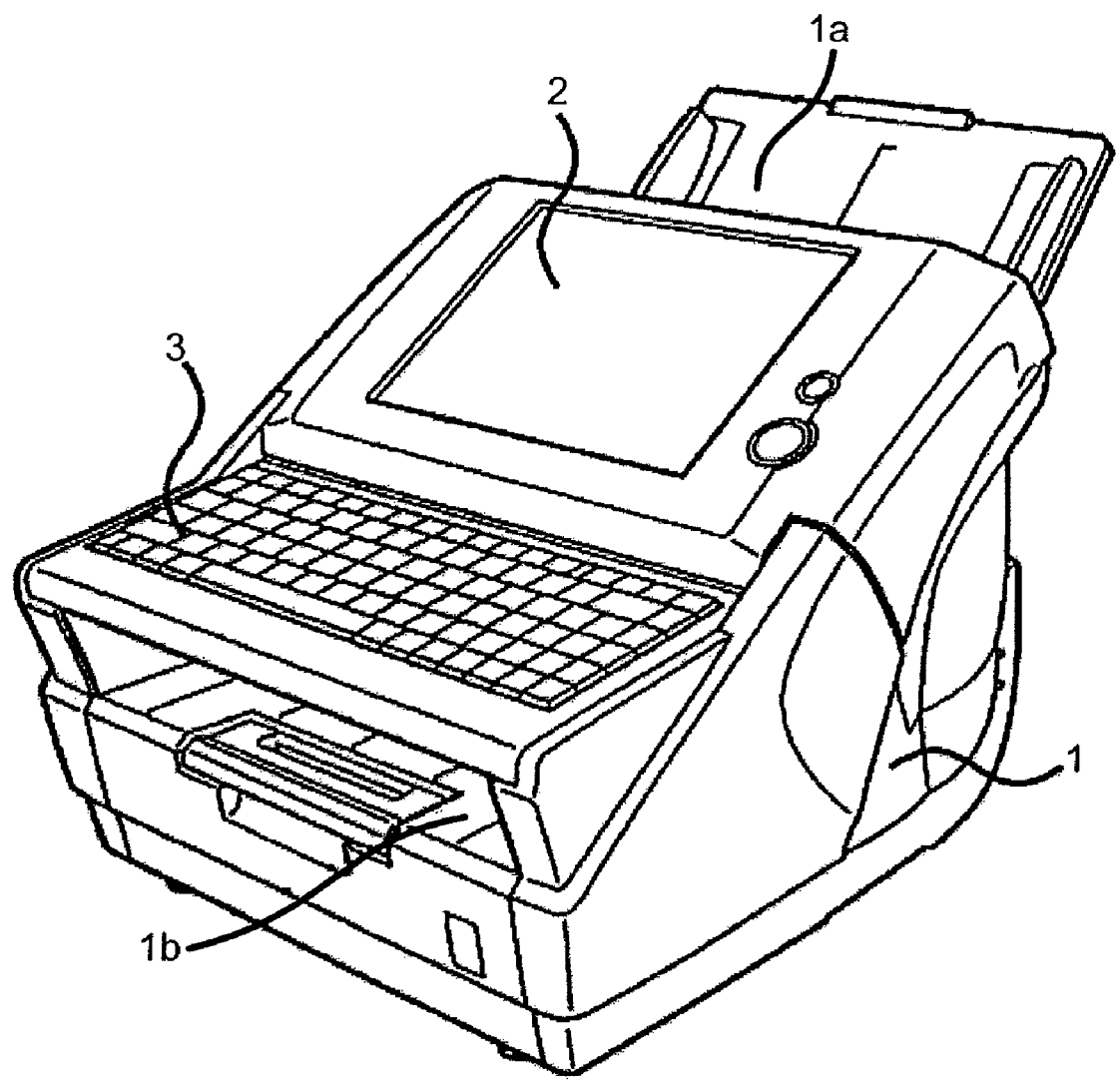
FIG. 1 is a schematic diagram of an embodiment of the present invention.

Exemplary embodiments of the present invention are explained below.

In a structure of an automatic document feeder (ADF) type scanning apparatus according to the present invention, a keyboard and a display screen are arranged such that the keyboard and the display screen cover the upper side of a main body of the ADF-type scanning apparatus.

Due to this, because a large space can be secured for arranging the keyboard and the display screen, a large full size keyboard can be used as the keyboard and a large display screen can be used as the display screen. Thus, an installation area of the scanning apparatus can be reduced while enhancing convenience of the user.

In the structure of the scanning apparatus, the display screen includes an ADF-cover opening-closing mechanism that can open and close in conjunction with an ADF cover of the scanning apparatus.

Due to this, although the large display screen envelops a sheet feeder of the scanning apparatus, even if a malfunctioning such as a jam occurs, carrying out an operation to open or close the display screen enables to open or close the ADF cover of the scanning apparatus in conjunction with the display screen. Thus, the display screen can be easily opened or closed using a single action even when carrying out a maintenance operation, of removing the malfunctioning such as the jam, inside the main body of the scanning apparatus. Thus, operability of a user is not affected.

The keyboard includes a keyboard raising mechanism that raises a front portion of the keyboard in the upward direction.

Due to this, although the keyboard is the large size keyboard and envelops the upper side of the sheet feeder of the scanning apparatus, the keyboard is raised to open a space on the upper side of a sheet ejection unit. Thus, even if the scanning apparatus has read a small size document such as a name card, the user can easily retrieve the small size document that is ejected into the sheet ejection unit.

Representative embodiments of the present invention are explained next with reference to the accompanying drawings. In the embodiments explained below, the same portions are indicated by the same reference numerals and a detailed explanation is omitted.

A first embodiment of the present invention is explained below.

The scanning apparatus according to the present invention can be applied to an ADF type network scanner in which a single scanning apparatus connected to the network is shared by a plurality of users.

As shown in FIG. 1, in the scanning apparatus, a display screen 2 and a keyboard 3 are arranged such that the display screen 2 and the keyboard 3 cover the upper side of a main body 1 of the scanning apparatus.

Arranging the display screen 2 and the keyboard 3 such that the display screen 2 and the keyboard 3 cover the upper side of the main body 1 enables to arrange the display screen 2 and the keyboard 3 without increasing the installation area of the main body 1. Thus, convenience of the user can be secured.

Figure 2:
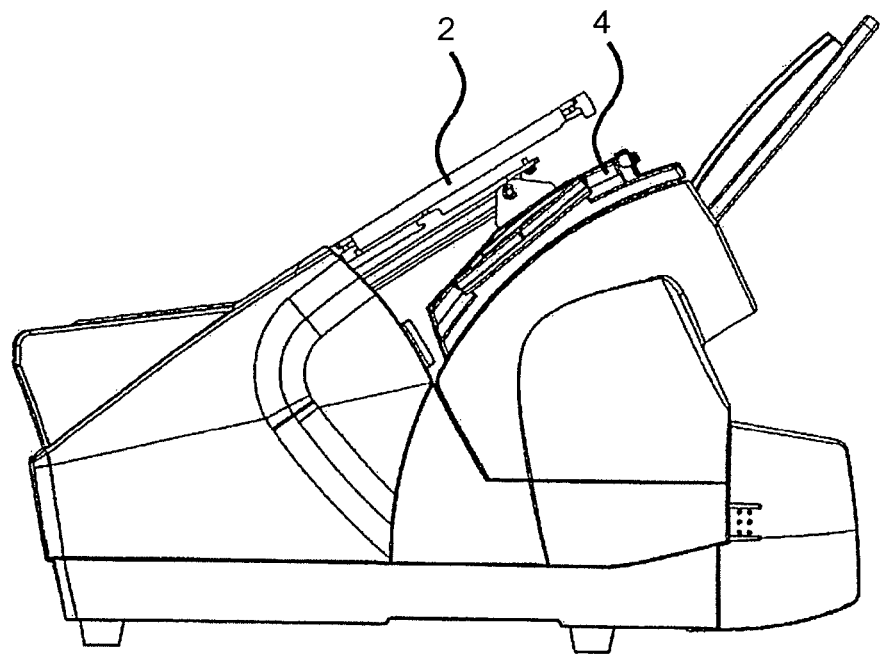
FIG. 2 is a schematic diagram for explaining a structure in which a display screen covers an ADF cover.

However, as shown in FIG. 1, the display screen 2 covers the space on the upper side of a sheet feeder 1a of the main body 1. Due to this, as shown in FIG. 2, if a malfunctioning such as a jam occurs during sheet feeding and an ADF cover 4 of the scanning apparatus needs to be opened, because the display screen 2 is covering the upper side of the ADF cover 4, opening and closing of the ADF cover 4 is hampered.

Figure 3:
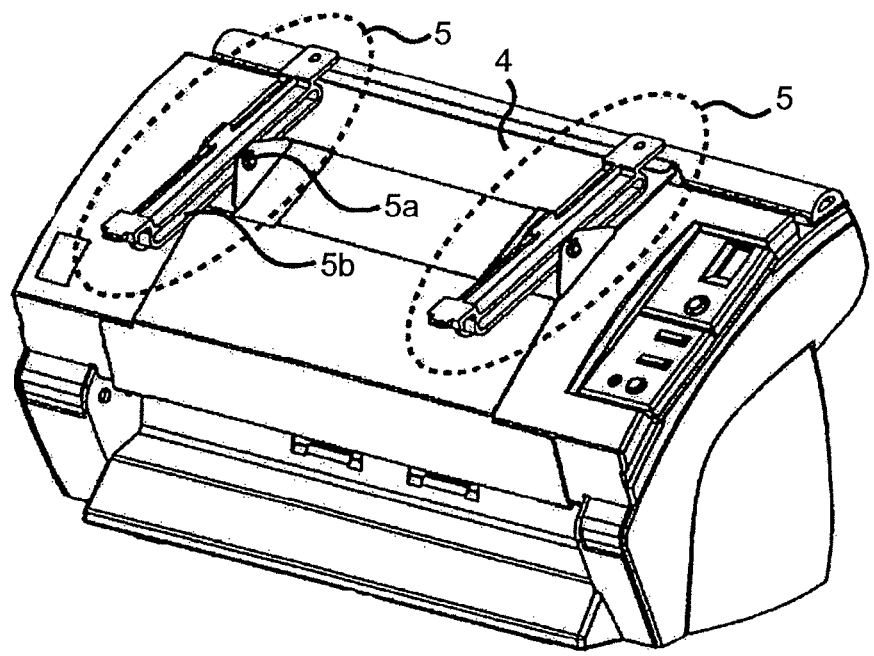
FIG. 3 is a schematic diagram of a structure of an ADF-cover opening-closing mechanism.

To overcome the drawback, as shown in FIG. 3, the display screen 2 of the scanning apparatus includes an ADF-cover opening-closing mechanism 5. The ADF-cover opening-closing mechanism 5 includes a guide rail 5b that is fixed to a back surface of the display screen 2 and an ADF-cover fixing unit 5a that is slidably linked to inside of the guide rail 5b.

Figure 4A:
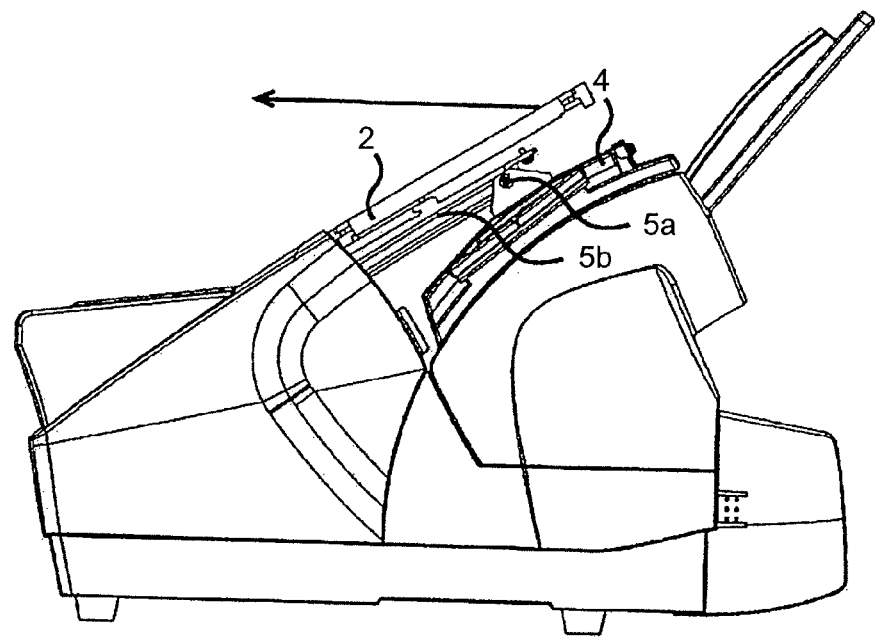
FIGS. 4A and 4B are schematic diagrams for explaining an operation of the ADF-cover opening-closing mechanism.
Figure 4B:
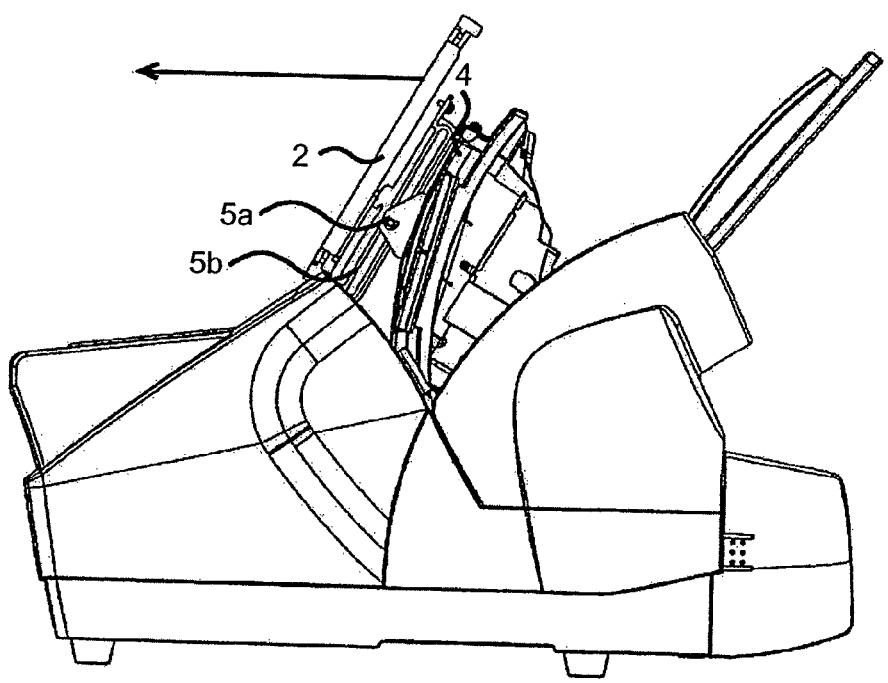
Figure 5:
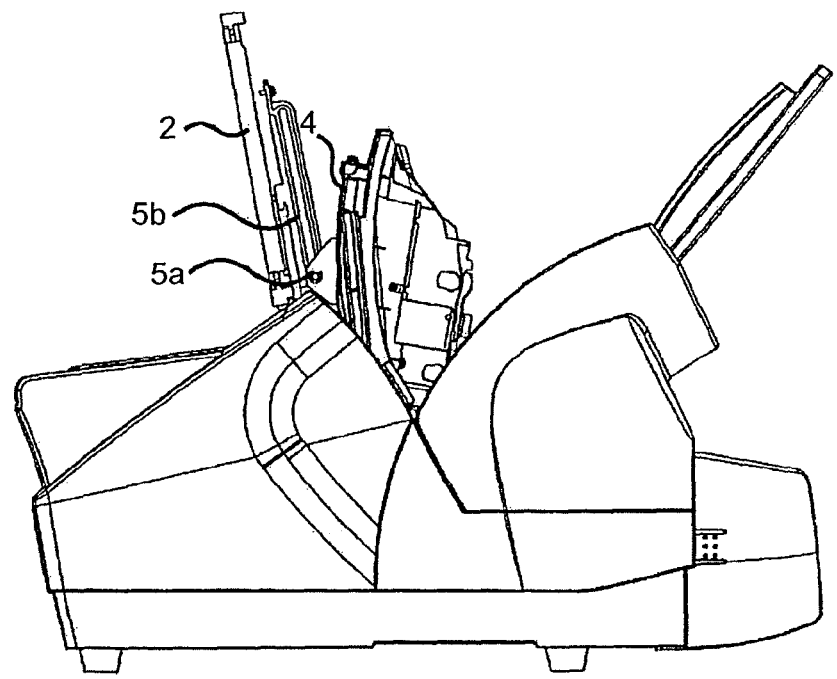
FIG. 5 is another schematic diagram for explaining the operation of the ADF-cover opening-closing mechanism.

Due to this, as shown in FIG. 4A, when the user pulls and raises the display screen 2 of the scanning apparatus in a direction of the arrow, as shown in FIG. 4B, because the ADF-cover opening-closing mechanism 5 links the back surface of the display screen 2 and the ADF cover 4, the ADF cover 4 is raised in conjunction with the display screen 2 while the ADF-cover fixing unit 5a moves along the inside of the guide rail 5b. Thus, as shown in FIG. 5, the ADF cover 4 simultaneously opens simply by pulling and raising the display screen 2, and the ADF cover 4 can be completely opened in conjunction with the display screen 2.

Using the ADF-cover opening-closing mechanism 5 to raise and to lower the display screen 2 also enables to simultaneously open and close the ADF cover 4. Due to this, even upon occurrence of malfunctioning such as a jam during the sheet feeding, the ADF cover 4 of the scanning apparatus is simultaneously opened or closed using a single action of opening or closing the display screen 2. Thus, the maintenance operation, of removing the malfunctioning such as the jam, inside the scanning apparatus can be carried out.

Further, as shown in FIG. 1, the keyboard 3 of the full size is covering the space on the upper side of a sheet ejection unit 1b of the scanning apparatus. Due to this, when the scanning apparatus reads a small size document such as a credit card or a name card, even if the document is ejected into the sheet ejection unit 1b, because the document is beneath the keyboard 3, retrieving the document becomes difficult.

Figure 6:
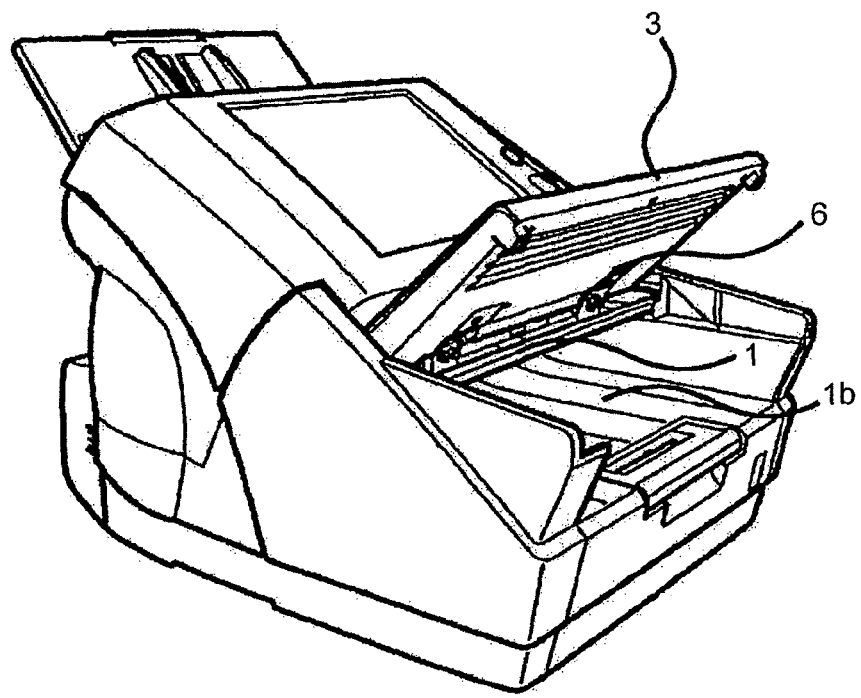
FIG. 6 is a schematic diagram for explaining an operation of a keyboard raising mechanism.
Figure 7:
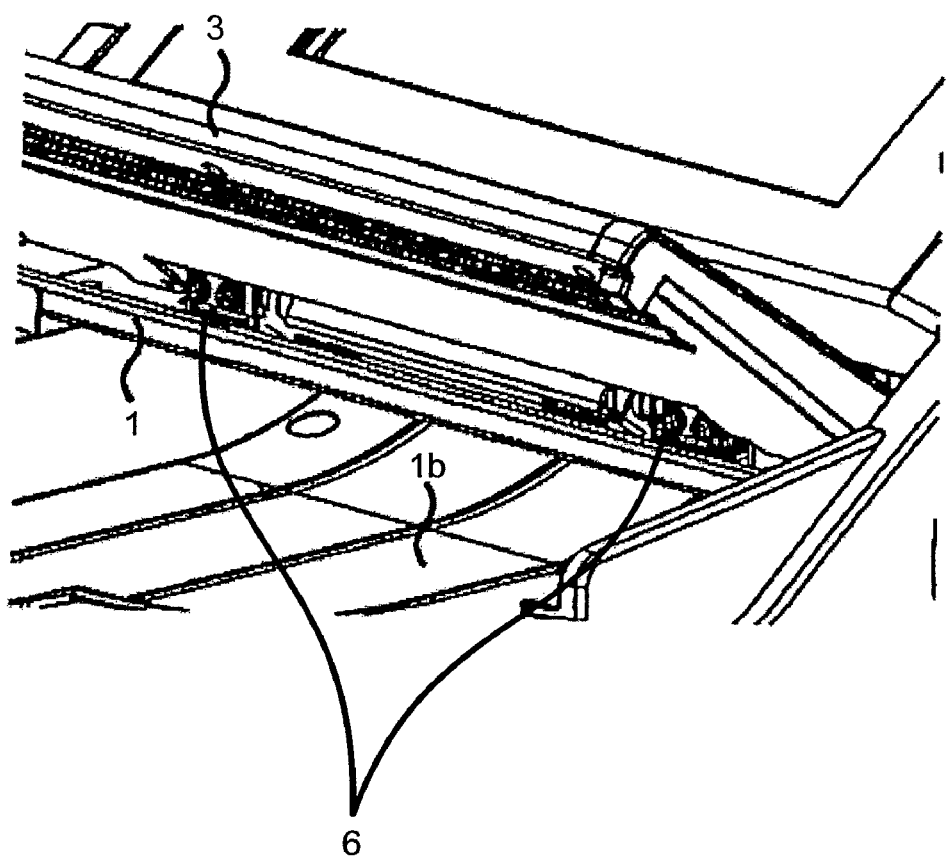
FIG. 7 is another schematic diagram for explaining the operation of the keyboard raising mechanism.

To overcome the drawback, as shown in FIGS. 6 and 7, a connecting unit, in the form of a rotating fulcrum, with the main body 1 is arranged at the back end side of the keyboard 3. Thus, a keyboard raising mechanism 6 is provided that raises the front side of the keyboard 3 in the upward direction.

Due to this, even if the scanning apparatus reads the small document such as the credit card or the name card, the document is ejected into the sheet ejection unit 1b, and the document is hidden beneath the keyboard 3, raising the keyboard 3 enables to easily retrieve the ejected document.

The present invention is explained based on an example of the network scanner. However, the present invention is not limited to the network scanner, and can be widely applied to a scanning apparatus that includes the display and the keyboard.

The present invention uses the following means to overcome the drawbacks mentioned earlier.

A large space can be secured to arrange a keyboard and a display screen. Thus, the full size keyboard and the large display screen can be used.

If the keyboard and the display screen are arranged such that the keyboard and the display screen cover the upper side of an ADF type scanning apparatus main body, when a malfunctioning such as a jam occurs in a sheet feeder of the scanning apparatus due to the display screen and an ADF cover of the scanning apparatus needs to be opened for removing the malfunctioning, because the display screen covers the ADF cover of the scanning apparatus, opening and closing of the ADF cover is hampered.

If the scanning apparatus reads a small size document such as a credit card or a name card, a retrieval of the document, which is ejected into the sheet feeder of the scanning apparatus, is hampered due to the keyboard that covers the upper side of the ADF type scanning apparatus main body. Thus, the read document cannot be retrieved.

The effects indicated below can be expected due to the present invention.

In a network scanner in which a plurality of users can sharedly use a single scanning apparatus that is connected to the network, a keyboard and a display screen are necessitated for specifying a destination of read image data and for inputting a password due to security requirements.

When including an input output device such as the keyboard and the display screen in an ADF type scanning apparatus, for reducing an installation area as much as possible to enhance a degree of freedom of an installation space of the scanning apparatus, the commonly used ADF type scanning apparatus uses a numerical keypad or a touch panel as the keyboard and a small screen as the display screen. However, when using the scanning apparatus mentioned earlier, convenience of the user is affected.

Applying the present invention to an ADF type network scanner enables to use a large full size keyboard as the keyboard and a large screen as the display screen. Thus, the ADF type scanning apparatus, which is highly convenient for the user, can be provided while reducing the installation area.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A scanning apparatus comprising:
a main body;
an automatic document feeder configured to automatically feed a plurality of documents one by one; and
a keyboard and a display screen arranged to cover an upper side of the main body,
wherein the display screen includes a cover opening-closing mechanism configured to open and close an automatic-document-feeder cover in conjunction with the display screen,
wherein the cover opening-closing mechanism includes a guide rail fixed to the display screen and a cover fixing unit configured to be slidably linked to the guide rail and to move along the guide rail so that the automatic-document-feeder cover is raised and opened in conjunction with a single action of opening the display screen.

2. The scanning apparatus according to claim 1, wherein the keyboard includes a keyboard raising mechanism configured to allow a front portion of the keyboard to be raised in an upward direction so as to retrieve one or more of the documents beneath the keyboard.

3. The scanning apparatus according to claim 1, wherein the guide rail is fixed to a back side of the display screen.

4. A scanning apparatus comprising:
a main body;
a sheet feeder positioned in the main body;
a feeder cover openably disposed over the sheet feeder and configured to cover at least a portion of the sheet feeder if the feeder cover is closed;
a display screen positioned over the feeder cover and an upper side of the main body;
a cover opening-closing mechanism coupled between the display screen and the feeder cover and configured to open or close the feeder cover in conjunction with the display screen; and
a keyboard positioned over the upper side of the main body,
wherein the cover opening-closing mechanism comprises:
a guide rail fixed to the display screen; and
a cover fixing unit fixed to the feeder cover and slidably coupled to the guide rail.

5. The scanning apparatus of claim 4, wherein the guide rail is fixed to a back side of the display screen.

6. The scanning apparatus of claim 4, further comprising:
a sheet ejection unit positioned in the main body; and
a keyboard raising mechanism configured to allow a front portion of the keyboard to be moved in an upward direction so as to expose at least a portion of the sheet ejection unit.

7. A scanning apparatus comprising:
a main body;
an automatic document feeder positioned in the main body and configured to automatically feed a plurality of documents one by one; and
a keyboard and a display screen arranged to cover an upper side of the main body,
wherein the display screen includes a cover opening-closing mechanism configured to open and close an automatic-document-feeder cover in conjunction with the display screen,
wherein the cover opening-closing mechanism includes a guide rail fixed to a back surface of the display screen and a cover fixing unit configured to be slidably linked to inside of the guide rail and to move along the inside of the guide rail so that the automatic-document-feeder cover is simultaneously raised and opened in conjunction with a single action of opening the display screen.

8. The scanning apparatus according to claim 7, wherein the keyboard includes a keyboard raising mechanism configured to allow a front portion of the keyboard to be raised in an upward direction so as to retrieve one or more of the documents beneath the keyboard.

* * * * *